(12) United States Patent
Wensauer

(10) Patent No.: US 6,355,167 B1
(45) Date of Patent: Mar. 12, 2002

(54) APPARATUS FOR FILTERING CONTAMINATED LIQUIDS

(75) Inventor: Dietmar Wensauer, Köln (DE)

(73) Assignee: MSG Maschinen-und Stahlbau GmbH, Muhlenstrasse (DE)

( * ) Notice: Subject to any disclaimer, the term of this patent is extended or adjusted under 35 U.S.C. 154(b) by 0 days.

(21) Appl. No.: 09/660,307

(22) Filed: Sep. 12, 2000

(30) Foreign Application Priority Data

Oct. 4, 1999 (DE) .......................................... 199 47 724

(51) Int. Cl.$^7$ .......................... B01D 29/31; B01D 29/64; B01D 35/027; B01D 36/04; B23Q 11/00
(52) U.S. Cl. ...................... 210/232; 210/295; 210/298; 210/411; 210/415; 210/460; 210/416.5; 210/462
(58) Field of Search .............................. 210/415, 416.5, 210/168, 232, 460, 462, 295, 298, 411, 311, 312

(56) References Cited

U.S. PATENT DOCUMENTS

| | | | |
|---|---|---|---|
| 786,549 A | | 4/1905 | Dion |
| 2,371,895 A | * | 3/1945 | Kingman |
| 2,775,348 A | * | 12/1956 | Williams |
| 3,334,749 A | * | 8/1967 | Ladd |
| 3,585,133 A | * | 6/1971 | Honan et al. |
| 3,674,151 A | * | 7/1972 | Freeland |
| 4,673,502 A | * | 6/1987 | Fox |
| 4,985,146 A | * | 1/1991 | Fox et al. |
| 5,738,782 A | * | 4/1998 | Schäfer et al. |

FOREIGN PATENT DOCUMENTS

| | | |
|---|---|---|
| DE | 196 35 364 A1 | 5/1997 |
| DE | 197 35 446 A1 | 2/1999 |
| EP | 0 557 258 A1 | 8/1993 |
| JP | 58-079513 * | 5/1983 |
| JP | 59-193109 A * | 11/1984 |
| JP | 2-119904 A * | 5/1990 |
| WO | WO 93/01878 | 2/1993 |

* cited by examiner

*Primary Examiner*—Thomas M. Lithgow
(74) *Attorney, Agent, or Firm*—Vickers, Daniels & Young

(57) ABSTRACT

The apparatus according to the invention for filtering contaminated liquids, such as cooling and/or lubricating liquids which are employed during the machining of workpieces with metal removal for example, has a liquid container (11) with an inlet (13) for contaminated liquid and an outflow (15) for filtered liquid, and a filtering insert which can be connected to the outflow is disposed in the container. In order to ensure high throughputs of liquid through the filtering insert, which are necessary in particular when full-flow filtration is employed, whilst at the same time keeping the requisite basal area and volume of the container as small as possible, it is proposed according to the invention that the filtering insert (18) substantially consists of a filter drum (19) which can be installed in the liquid container (11) fixed in relation thereto and which comprises a filter (25) which is disposed at its periphery and which can be cleaned by a cleaning device (28) which can be moved along the peripheral face of the drum. Since the filter drum is fixedly disposed in the liquid container, it can be connected directly, via a suction pipe and without a costly rotary lead-through, to the feed pump for the purified filtrate, which removes the filtrate directly from the filter drum by suction and which generates a comparatively high vacuum in the interior of the filter drum, which considerably increases the liquid throughput through the filter compared with known full-flow filtration apparatuses of the same surface area.

22 Claims, 2 Drawing Sheets

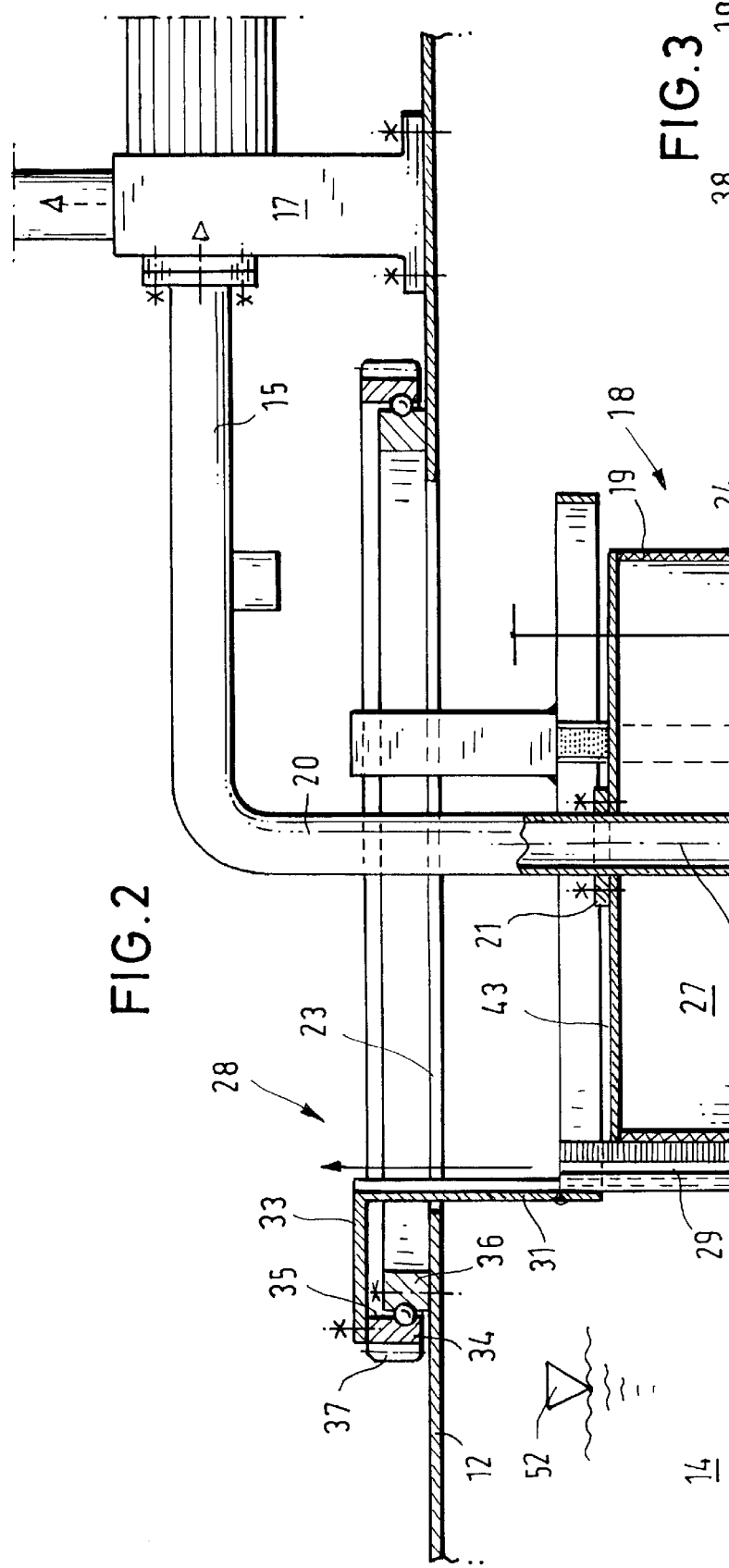

APPARATUS FOR FILTERING CONTAMINATED LIQUIDS

FIELD OF INVENTION

This invention relates to an apparatus for filtering contaminated liquids, particularly cooling and/or lubricating liquids which are employed during the machining of workpieces with metal removal, comprising a liquid container with an inlet for contaminated liquid and an outflow for filtered liquid, in which container a filtering insert is disposed which can be connected to the outflow.

BACKGROUND OF INVENTION

Apparatuses of this type, which are also sometimes termed sieve separators, are employed during the machining of workpieces with metal removal for the conditioning of cooling and lubricating liquids which are used in grinding, turning, milling, etc, and which have to be freed from material swarf and dust as extensively as possible before they can be reused as cooling lubricants. Contaminated liquid reaches the liquid container via the inlet and is taken off as purified liquid via the outflow after it has flowed through the filtering insert, which retains swarf and dust from the liquid. The separated contaminants can be automatically removed by means of an extractor device. If the amount of contaminants which arise is small, it is also possible for the liquid to be discharged from the filtering apparatus and for the sludge which has accumulated over the course of time to be removed by hand.

An apparatus of the type cited at the outset is known from DE 196 35 364 A1, in which a bar screen is disposed in the liquid container as a filtering insert, the inlet side of which is directed downwards, wherein the scraper chain of a scraper conveyor is led past the inlet side of the bar screen in order to clean the bar screen. In this known apparatus, the area of the bar screen through which the liquid can flow during filtration is limited and is restricted by the length and width of the liquid container. Since the space taken up by filtering apparatuses in the vicinity of machine tools should be designed to be as small as possible, and a compact mode of construction of the filtering apparatus is therefore required, this known apparatus is in most cases unsuitable for full-flow filtration, in which the entire liquid is filtered at a constant degree of fineness. Consequently, it is generally only used for partial flow filtration in which only part of the liquid is finely filtered through the bar screen using an aperture width of 50 $\mu$m or 75 $\mu$m, whilst the remainder of the liquid to be purified is deemed to be satisfactory with somewhat inferior degree of filtration which can be achieved via a further, coarser filter, or which can be achieved by means of a stack of plates which results in calming of the flow, as a result of which contaminants which are entrained in suspension are able to settle in the contaminated liquid.

For throughputs comprising larger amounts of liquid which have to be finely filtered by full-flow filtration, apparatuses are known in which a filtering insert which rotates about a horizontal axis is disposed immersed in the liquid. The contaminated liquid flows into the interior of the drum through a filter means disposed at the periphery of the filtering insert and is discharged via a suction pipe connected to the insert. At least one scraper is disposed in the container parallel to the axis of rotation of the drum and is pressed against the insert, and when the scraper rotates it removes contaminants which have been deposited on the filter means. These contaminants then sink downwards in the liquid container and are removed from the container by a rake apparatus.

In this known apparatus for full-flow fine filtration, the discharge of the filtrate from the interior of the filtering insert frequently causes problems, since the suction pipe is led via a rotary lead-through into the interior of the filter, which is difficult to seal from the contaminated liquid. In this known apparatus, only a comparatively small pressure difference can be employed between the interior of the filter and the liquid on the outside thereof, so that intermediate storage of the filtrate in a filtrate tank directly behind the filtering insert is necessary. From the filtrate tank, the filtrate can be fed back to the machine tool or the like by means of feed pumps. In this known apparatus it has proved particularly difficult to install and remove the filtering insert. These are operations which have to be carried out at regular intervals in order to subject the filter to a thorough cleaning procedure if contaminants which have not been removed by the scraper have blocked the filter means of the insert over the course of time.

SUMMARY OF THE INVENTION

The object of the present invention is to improve an apparatus of the type cited at the outset so that a high throughput of liquid through the filtering insert is achieved for an apparatus of comparatively small external dimensions, wherein it should be possible to take off the filtrate directly from the liquid container without additional filtrate collecting vessels, and wherein it should be possible in addition to ensure reliable cleaning of the filtering insert in operation, and to ensure ease of replacement of the filtering insert.

This object is achieved according to the invention by providing a filtering insert which substantially consists of a filter drum which can be installed in the liquid container fixed in relation thereto and which comprises a filter means which is disposed at its periphery and which can be cleaned by a cleaning device which can be moved along the peripheral face of the drum. The filter drum is preferably cylindrical and is disposed suspended or standing on an end face in the liquid container, and can be inserted therein from above and can be removed from the container from above.

The use of a filter drum at the periphery of which the filter means is disposed results in a large filter area which is sufficient even for high liquid throughputs. Since the filter drum itself does not rotate in the liquid container, but is fixedly disposed in relation thereto, the costly rotary lead-through which was used in the prior art between the interior of the filter drum and the take-off pipe for the filtrate can be dispensed with. Instead, it is possible to attach and seal the pipe for the filtrate fixedly to the filter drum by a flange or by another means, and to remove the filtrate directly from the interior of the filter drum by means of a feed pump. A relatively large pressure drop can thereby be achieved between the outside and the inside of the filter, which results in a high throughput through the available filter area.

Since the filter drum can be removed from the container from above, and can be inserted in the latter from above, the liquid of the liquid container does not need to be discharged when the filter drum is replaced, so that the down-time of the apparatus when changing the drum can be kept to a minimum. The drum can be replaced within a few minutes, by detaching it from the flanged joint to the feed pump, pulling it upwards from the container together with part of the suction line, and replacing it by a new drum, which then only has to be flanged to the feed pump before it can be put in operation. Outflow of the filtrate advantageously occurs via a filtrate suction pipe which projects into the drum interior and which is sealed by an end face of the filter drum. At the same time, the arrangement can be designed so that the filter drum is disposed suspended on the filtrate outflow, and so that no additional fixing means are therefore necessary for the fixed mounting thereof in the interior of the liquid container.

The filter drum can have a discharge opening on its bottom end face, which discharge opening can be opened or closed from the top end face. In order to remove the filter drum, which is necessary for the replacement thereof or for a thorough cleaning operation, the discharge opening on the bottom end face can be opened from the top face of the drum, so that any filtrate which still remains in the interior of the drum can drain downwards therefrom when the drum is lifted upwards out of the liquid container. To facilitate thorough cleaning of the drum, which is carried out subsequently to the removal thereof, the drum advantageously has a closable cleaning aperture on its top and/or bottom end face. After opening the cleaning aperture, the interior of the drum is accessible in order to clean the interior space of the drum with a high-pressure cleaning device, for example.

The filter means at the periphery of the filter drum is advantageously a bar screen, which is subjected to practically no abrasion and which can be cleaned particularly easily. In order to clean the filter means when the filter is in operation, the cleaning device preferably comprises at least one cleaning element which extends over the height of the filter drum and which can be moved round the filter drum periphery along the filter means. The entire cleaning device is preferably mounted on the top face of the container so that it is immersed therein, and is advantageously rotatably mounted on the container top face by means of a pivot bearing. The cleaning device can then be moved around the fixedly disposed filter drum by means of a suitable drive motor, whereupon the cleaning element or elements is/are moved along the peripheral face of the drum and at the same time remove contaminants which have been deposited there. Each cleaning element advantageously consists substantially of a scraper- and/or brush strip which can be moved along the filter means.

It is particularly advantageous if the cleaning element is mounted replaceably on the cleaning device. If wear has occurred, it can then easily be replaced by a new cleaning element, and it is also possible to use cleaning elements which ensure the best possible cleaning effect for the type of contamination which occurs in each case for different contaminants in the liquid, such as grinding dust or turning, milling or shaving swarf for example. The cleaning element can preferably be removed from or installed in the cleaning device from the top face of the container, and can therefore be replaced without it being necessary to drain off liquid from the liquid container in order to obtain access to the cleaning element.

The cleaning device preferably comprises a plurality of cleaning elements which are disposed on a common retaining ring surrounding the filter drum, preferably at a uniform spacing from each other. Due to the uniform arrangement of a plurality of cleaning elements which all clean the filter means of the filter simultaneously, the contact pressure forces which are exerted by the cleaning elements on the drum cancel each other out, so that the drum is securely fixed within the container even when it is merely suspended via the outflow to which is flanged, and is not subjected to a load which acts radially on it.

In one particularly advantageous embodiment of the invention, the filter drum or the suspension thereof and the cleaning device are disposed on a common cover of the liquid container. This arrangement even makes it possible to equip existing liquid containers with the filter drum and the associated cleaning device according to the invention, simply by suspending them from above in a liquid container which has been freed from its previous built-in filter components, wherein the common cover can be supported at the top edge of container. The filter means disposed at the periphery of the filter drum is preferably completely immersed in the liquid to be filtered in the liquid container, so that the feed pump which is connected to the suction line is reliably prevented from completely removing by suction the filtrate which is present in the interior of the filter drum. In order to ensure the permanent, complete immersion of the filter drum in the liquid during the operation of the filtering apparatus, a level switch is advantageously disposed in the liquid container in the manner known in the arts, and ensures that the feed pump for the liquid is switched off when the liquid level falls below a predetermined level.

The cleaning element is preferably displaceably accommodated in a profiled retaining strip, and is advantageously height-adjustable in relation to the filter drum. The axial displaceability of the cleaning element in the profiled retaining strip enables it to be replaced particularly easily on the occurrence of wear or the like. Said height-adjustability in relation to the filter drum is capable of further improving the result of cleaning the filter means when the latter is swept, since cleaning is thereby not only effected in the peripheral direction of the filter drum, but is also effected in the axial direction thereof, whereby it is ensured that contaminants such as swarf, for example, which have settled in the apertures of the filter means which is designed as a bar screen, are completely pulled out of the apertures again or are at least sheared off, and it is thereby possible to create a smooth surface on the filter means on which further contaminants cannot easily deposit.

For some purposes of use, the apparatus according to the invention preferably comprises a flushing device for the filter drum, which device substantially consists, for example, of a backflushing pump which delivers into the interior of the filter drum. It is also possible for at least one of the cleaning elements to be operated with a pressure cleaning unit which can be acted upon by liquid under pressure and which not only cleans the filter means at the periphery of the filter drum mechanically by means of a scraper or a brush, but which also ensures hydraulic cleaning by directing liquid under pressure on to the filter means. In particular, a cleaning procedure such as this can be recommended if the liquid to be purified has been discharged from the container, for example when an inspection of the container is to be made or when filter sludge has to be removed after the filtering apparatus has been in operation for an extended period.

The liquid container can be provided in the manner known in the art with an extractor device which is disposed at least in part under the filter drum, and by means of which the filter sludge which settles under the filter drum can be automatically removed from the container. The extractor device advantageously consists substantially of a scraper conveyor with conveying scrapers which can move along the container base and which entrain filter sludge, swarf and the like during their movement over the container base and which advantageously convey them via a ramp to an ejector device, where they are transferred to a contaminant vessel. In one particularly advantageous embodiment, the filter drum is provided at its bottom end face with an additional filter means, wherein the top belt of the scraper conveyor, with its conveying scrapers, is led past the additional filter means and thereby cleans the latter. Therefore, not only is the peripheral face of the filter drum used as a filter surface in this embodiment, but the bottom end face thereof is also used for this purpose, whereby an even higher liquid throughput can be achieved. In this embodiment also, the filter drum is fixedly disposed in the liquid container and can be withdrawn from the container from above or inserted therein from above without previously discharging the liquid to be filtered from the container.

Further features and advantages of the invention follow from the description given below and from the drawings, which illustrate an example of a preferred embodiment of the invention.

BRIEF DESCRIPTION OF DRAWINGS

FIG. 2 shows an enlarged area from the subject of FIG. 1 in the region of the filter drum and cleaning device; and FIG. 3 is an illustration, on an enlarged scale, of a detail from FIG. 2 as a section along line III—III.

DETAILED DESCRIPTION

Figure 1:
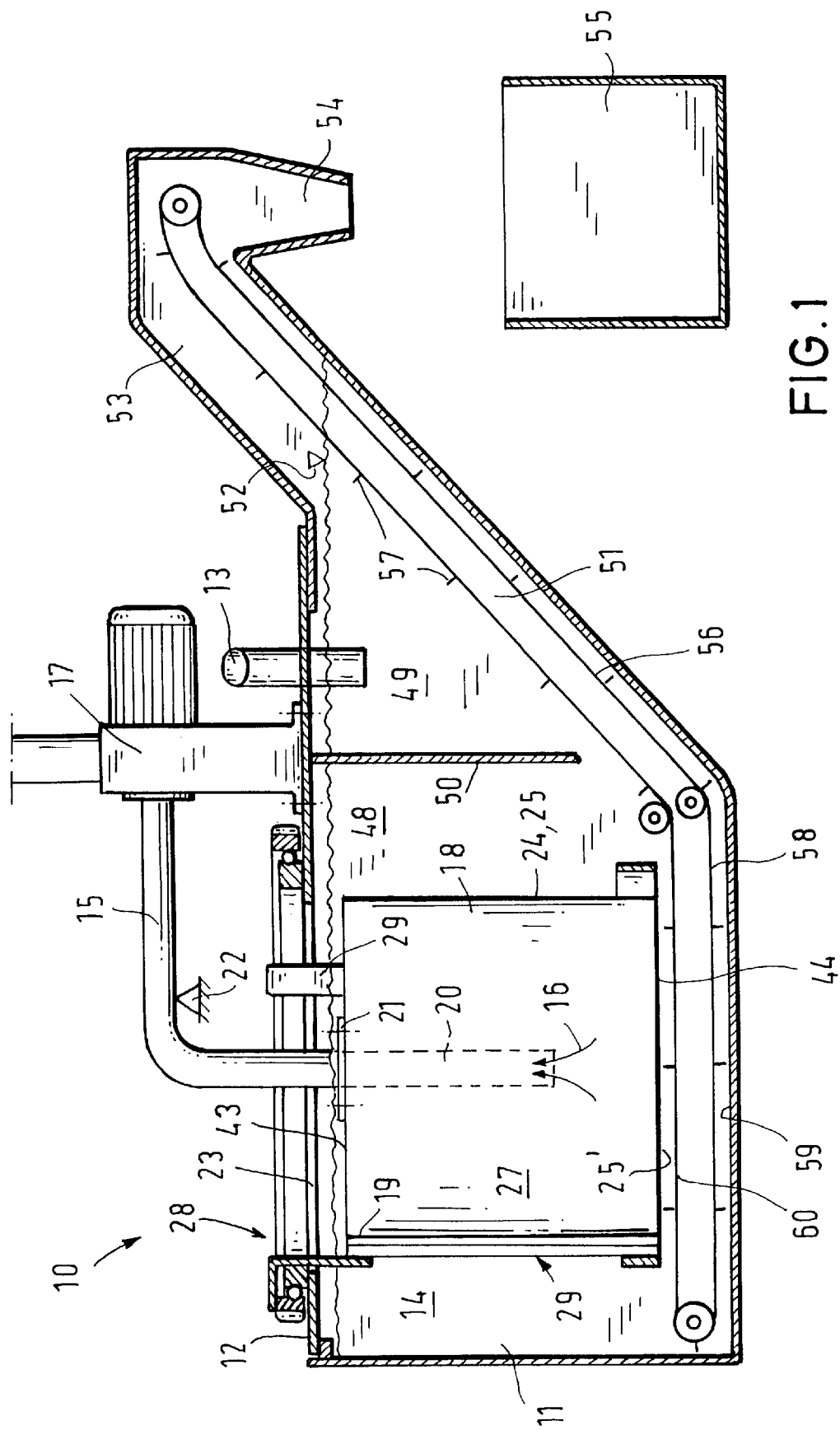
FIG. 1 is a schematic illustration, as a longitudinal section, of an apparatus for filtering contaminated liquids.

The drawings show an apparatus 10 for filtering cooling lubricant liquids for machine tools, by means of which swarf, grinding dust, and the like are removed from the liquid before the cooling lubricant is fed to the machine tool again.

The apparatus 10 comprises a liquid container 11 which is closed at its top face by a cover 12. An inlet 13 for contaminated liquid 14 which comes from the machine tool is disposed on the cover. An outflow 15 for the clean filtrate 16 is situated on the cover 12, at the side near the inlet 13. The clean filtrate is fed back to the machine tool, which is not illustrated, by means of a feed pump 17, which is merely illustrated schematically.

In order to filter the liquid 14, a filtering insert 18, which substantially consists of a cylindrical, upright filter drum 19, is disposed in the liquid container 11, and is completely immersed in the liquid 14 in the container 11. The filter drum 19 is rigidly attached to a suction pipe 20 of the outflow 15 via a flange 21, wherein the outflow or the suction pipe is supported on a bearing 22, which is merely illustrated schematically, and holds the filter drum 19 suspended in the container from the top face 23 thereof.

Due to this arrangement, when the filtering apparatus is in operation the filter drum is substantially fixedly mounted in relation to the liquid container, and is therefore immersed in the container as a rigid component. At its periphery 24, the cylindrical drum is provided over its entire height and over its entire periphery with a filter means 25, as can best be seen from FIG. 2. The filter means 25 is a bar screen 26, which is known in the art in filtration, and which, in order to separate contaminants from the contaminated liquid, comprises bars which are situated closely one above another on its outer face, and between which there are apertures with a small aperture width. The liquid to be filtered flows through the apertures, whereby swarf and/or grinding dust, the dimensions of which are greater than the aperture thickness of 50 µm or 75 µm for example, cannot pass through the apertures but are deposited on the outside of the bar screen 26. The filtrate 16 which has flowed into the interior 27 of the filter drum is directly removed from the drum by suction via the suction pipe 20, and is pumped to the machine tool by the feed pump 70. The vacuum which is thereby generated in the interior 27 of the drum assists the flow of liquid 14 through the bar screen.

In order to clean the filter means 25, the apparatus 10 comprises a cleaning device 28, which substantially consists of three cleaning elements 29, which are uniformly distributed over the periphery of the filter drum, and of a lower and upper retaining ring 30; 31 on which the cleaning elements 29 are disposed parallel to the axis of the drum. The upper retaining ring 31 is constructed as a supporting flange 33 which projects upwards from the housing cover 12 and which is fixedly attached to the outer ring 34 of a rolling bearing 35. The inner ring 36 of the rolling bearing is fixedly attached to the housing cover 12. This arrangement makes it possible for the upper supporting flange 33 to be rotated and thus for the entire cleaning device 28 to be rotated in relation to the filter drum 19, which is fixedly held in the liquid container, for which purpose a drive motor, which is not illustrated, is provided, a drive pinion of which meshes with a toothed section 37 disposed on the outer ring 34 of the rolling bearing 35.

As can clearly be seen from FIG. 2, the three cleaning elements 29 are seated against the periphery 24 of the filter drum and can thereby mechanically remove contaminants which have been deposited on the outside of the drum when the cleaning device 28 is rotated by the drive motor. As can clearly be seen from FIG. 3, the cleaning elements 29 each consist of a scraper strip 38 and of a brush strip 39, which are both placed against the drum. The brush strip 39 and the scraper strip 38 are mounted replaceably on the retaining rings 30, 31, for which purpose a profiled retaining strip 40 is provided for each cleaning element between the upper and lower retaining rings. The scraper strip 38 is screwed to the profiled retaining strip by means of fastening screws and is inserted from the top face 23 of the apparatus into the brush strip 39 over the entire length thereof, wherein ribs 41 on the profiled retaining strip fit into correspondingly fashioned slots 42 in the brush strip and secure the latter in directions transverse to the direction of insertion. The brush strip substantially consists of a flexible material, for example of rubber, which in the absence of an external force does not move by itself along the profiled retaining strip.

It can be recognised that the fixed arrangement of the filter drum 19 in the liquid container 11 enables it to be connected in a pressure-tight manner and without problems to the suction pipe 20 of the outflow 15, which is fixedly flanged to the top end face 42 of the drum. As distinct from previously known filter drums which were used for a high liquid throughput, particularly for full-flow filtration, according to the present invention there is no need for a rotary leadthrough between the drum and the suction pipe, the sealing of which regularly causes problems and which is therefore not only susceptible to wear but which also only permits filtration to be effected using a comparatively slight pressure drop, due to which the requisite surface area of the filter medium and thus the size of the filter drum at a given liquid throughput is greater than that according to the present invention. Due to the particularly advantageous suspended arrangement of the drum, which is immersed in the liquid container from the top face 23 of the cover, it is very easy to remove the drum, in order to replace it or in order to carry out a thorough cleaning operation, for example. As distinct from the filters which were known hitherto, it is thus not necessary to discharge the liquid 14 before the drum is removed from the container 11. Rather, the whole of the contaminated liquid can remain in the container, since after the suction pipe 20 has been removed from the feed pump 17 the drum 19 can be raised out of the liquid container from above without problems. In order to prevent the filtrate which is still contained in the drum interior 27 from also being removed from the container 11 when the drum is removed, the filter drum 19 comprises a closable discharge opening 45 on its bottom end face 44, which opening can be opened via an operating rod 46 which is accessible from the top face of the drum, so that when the drum is lifted out the filtrate can flow away through the discharge opening 45 and thus it is only the empty drum which has to be raised from the container. The drum which is constructed in this manner can then be replaced by another drum and the filtering apparatus can be set in operation again after a very short period of down-time. The drum which has been removed can be subjected to a careful, thorough cleaning operation, for which purpose it is provided at its bottom end face 44 with a cleaning aperture 47 which in operation is closed by a cover. After the cleaning aperture has been opened, the interior 27 of the drum can easily be cleaned by a high pressure cleaning device.

It is not necessary to remove the cleaning device 28 in order to remove and install the filter drum, nor does the drum have to be removed previously from the liquid container in order to replace the brush strips 39 of the cleaning device, because the brush strips can be pulled out upwards from their profiled retaining strips 40 and can be replaced by new cleaning elements, which may not only be brushes, but which may also be smooth stripping devices made of metal, plastics, rubber or ceramics, or serrated stripping devices or the like.

The liquid container of the apparatus 10 can be a simple container which is advantageously matched to the shape of the drum and which substantially consists only of a container base and of the upright container wall. However, a liquid container as illustrated in FIG. 1 has proved to be particularly advantageous. This container has a substantially rectangular basal shape, with a filter region 48 in which the filter drum is immersed from above into the container. The side of the filter region 48 is adjoined by a settlement region 49, which is separated from the filter region by a plate 50 which extends over the entire width of the container and which also extends to a point just above the base thereof. The inlet 13 for the contaminated liquid 14 leads into the settlement region 49, wherein contaminants which settle easily are deposited on the bottom in this region and do not even reach the filter region, but are extracted beforehand from the liquid container by an extractor device 51. For this purpose, the container is provided in the manner known in the art with an ejection shaft which projects above the liquid level 52, and the ejection opening 54 of which is situated above a contaminant container 54. The extractor device substantially consists of a scraper conveyor 36 comprising a multiplicity of conveying scrapers 57, wherein the conveying scrapers situated on the lower belt 58 are moved along the container base 59 in the filter region, in the settlement region and at the bottom of the ejection shaft and thereby entrain contaminants which have settled on the base of the liquid container and transfer them via the ejection opening into the contaminant vessel. It can be seen that the scrapers situated on the upper belt are led past the bottom end face 44 of the filter drum in the filter region, and it is also possible for the bottom end face of the filter drum to be provided with a filter means 25' also, and for the latter to be cleaned with the aid of the extractor device, if the effective filter area of the filter drum is to be increased further still. In this situation, the cleaning aperture 47 is advantageously not disposed on the bottom end face of the filter drum, but is disposed on the top end face 43 thereof.

The invention is not limited to the example of an embodiment which has been illustrated and described. Rather, many modifications and additions are possible without departing from the scope of the invention. It is possible, for example, for a flushing device to be associated with the filter drum, which flushing device ensures that contaminants which are deposited on the filter means are also removed again hydraulically, i.e. by means of the pressure of the liquid. For this purpose, it is possible for a liquid buffer to be disposed in the outflow for the filtrate 16, from which filtrate can be conveyed under high pressure back to the filter drum by reversing the direction of feed of the feed pump 17, whereby a back-flushing effect is exerted on the drum. The filtrate which flows back from the interior of the drum into the liquid container than entrains contaminants which have been deposited on the outside of the drum. It is also possible for a plurality of spray nozzles to be disposed over the height of the filter drum instead of the brush strips or scraper strips on the cleaning device, from which nozzles high-pressure liquid can be flushed against the outside of the drum. In particular, this is of interest if the liquid container is occasionally emptied completely, for example if it is not equipped with an extractor device and if contaminants occasionally have to be removed manually.

It is also possible for the entire cleaning device or the cleaning elements thereof to be disposed so that they can move in the axial direction 32 of the filter drum, so that during their circulation round the drum the cleaning elements are not only moved in the direction of the periphery but are also moved in a direction transverse thereto, whereby contaminants, some of which have already entered the apertures in the bar screen and have become lodged therein, can be removed more easily due to the up and down movement. The drum can be held immersed in the liquid container simply by the suction pipe 20, as in the embodiment described above. It is frequently advantageous, however, particularly for large and/or heavy drums, for the drum to be supported on a separate drum suspension. In apparatuses without an extractor device under the drum, it is also possible, of course, for the drum to be mounted on suitable bearings which are situated in the interior of the container on the base thereof. With the apparatus according to the invention, it is possible to effect full-flow fine filtration of the entire liquid to be filtered with a high degree of reliability, whilst maintaining a relatively small basal area and small volume of the liquid container, and the service intervals for the complete replacement or for the thorough cleaning of the filter drum after the removal thereof are extraordinarily long due to the reliable, continuous cleaning which is effected by means of the cleaning device. The down-time of the apparatus which is necessary for the removal and re-insertion of a drum is extraordinarily short due to the ability to remove the drum and correspondingly to reinstall the drum from the top face of the liquid container without problems, and for this purpose it is not even necessary to discharge any liquid from the liquid container.

What is claimed is:

1. An apparatus for filtering contaminated liquids comprising a liquid container which has a top end face and an inlet for contaminated liquid and an outflow for filtered liquid, and said apparatus further comprising a filtering insert which is disposed in said liquid container and which is connectable to said outflow, said filtering insert substantially consists of a filter drum which is adapted to be installed in said liquid container and fixed in relation thereto, said filter drum comprising a filter means which is disposed at the periphery thereof, said apparatus further comprising a cleaning device being moveable along the periphery of said filter drum to clean said filter means, said filter drum being cylindrical and having top and bottom end faces and is adapted to be inserted into and removed from said container from above, wherein said cleaning device is rotatably mounted on said top end face of said liquid container and, in use, said filter drum is immersed in liquid contained in said container.

2. An apparatus according to claim 1, wherein said liquid container is provided with an extractor device at least a part of which is disposed under said filter drum.

3. An apparatus according to claim 2, wherein the extractor device substantially consists of a scraper conveyor comprising scrapers which are conveyable along the base of said liquid container.

4. An apparatus according to claim 1, further comprising a filtrate suction pipe which projects into the interior of said drum and is sealed by one of said top or bottom end faces, in use, outflow of filtrate occurring via the filtrate suction pipe.

5. An apparatus according to claim 4, wherein said filter drum is suspended from the filtrate suction pipe.

6. An apparatus for filtering contaminated liquids comprising a liquid container which has an inlet for contaminated liquid and an outflow for filtered liquid, and further comprising a filtering insert which is disposed in said liquid container and which is connectable to said outflow, said filtering insert substantially consists of a filter drum which is adapted to be installed in said liquid container and fixed in relation thereto, said filter drum comprising a filter means which is disposed at the periphery thereof, said apparatus further comprising a cleaning device being moveable along the periphery of said filter drum to clean said filter means, said filter drum being cylindrical and having top and bottom end faces, said bottom end face comprises a discharge opening which is openable or closable from said top end face.

7. An apparatus according to claim 1, wherein said filter drum has a closable cleaning aperture on said top end face and/or on said bottom end face.

8. An apparatus according to claim 1, wherein said filter means is a bar screen.

9. An apparatus according to claim 1, wherein said cleaning device comprises at least one cleaning element which extends across the height of the filter drum and which is moveable around said periphery of said filter drum periphery along said filter means.

10. An apparatus according to claim 9, wherein said cleaning element further comprises a pressure cleaning unit which is operable using liquid under pressure.

11. An apparatus according to claim 1, wherein said cleaning device is rotatably mounted on said container top end face by means of a pivot bearing.

12. An apparatus according claim 9, wherein said cleaning element substantially consists of a scraper and/or brush strip which is moveable along the filter means.

13. An apparatus according to claim 9, wherein said cleaning element is replaceably mounted on said cleaning device.

14. An apparatus according to claim 9, wherein said cleaning element is removable and mountable on the cleaning device from said top end face.

15. An apparatus according to claim 1, wherein said cleaning device comprises at least one common retaining ring which surrounds said filter drum; and a plurality of cleaning elements disposed on said common retaining ring.

16. An apparatus according to claim 1, wherein said liquid container comprises a cover, said cleaning device being disposed on said cover.

17. An apparatus according to claim 9, wherein said cleaning device further comprises a profiled retaining strip, the cleaning element being accommodated in said retaining strip and being axially displaceable therein relative to said drum.

18. An apparatus according to claim 9, wherein the cleaning element is height-adjustable in relation to said filter drum.

19. An apparatus according to claim 1, comprising a flushing device for said filter drum.

20. An apparatus according to claim 19, wherein said flushing device substantially consists of a back-flushing pump for delivering filtrate into the interior of said filter drum.

21. An apparatus for filtering contaminated liquids comprising a liquid container which has an inlet for contaminated liquid and an outflow for filtered liquid, and further comprising a filtering insert which is disposed in said liquid container and which is connectable to said outflow, said filtering insert substantially consists of a filter drum which is adapted to be installed in said liquid container and fixed in relation thereto, said filter drum comprising a filter means which is disposed at the periphery thereof, said apparatus further comprising a cleaning device being moveable along the periphery of said filter drum to clean said filter means, said filter drum being cylindrical and having top and bottom end faces, said liquid container is provided with an extractor device at least a part of which is disposed under said filter drum, the extractor device substantially consists of a scraper conveyor comprising scrapers which are conveyable along the base of said liquid container, and said filter drum comprises an additional filter means at said bottom end face, the scrapers of the scraper conveyor being conveyable past said additional filter means.

22. An apparatus for filtering contaminated liquids comprising a liquid container which has a top end face and an inlet for contaminated liquid and an outflow for filtered liquid, and further comprising a filtering insert which is disposed in said liquid container and which is connectable to said outflow, said filtering insert substantially consists of a filter drum which is adapted to be installed in said liquid container and fixed in relation thereto, said filter drum comprising a filter means which is disposed at the periphery thereof, said apparatus further comprising a cleaning device being moveable along the periphery of said filter drum to clean said filter means, said filter drum being cylindrical and having top and bottom end faces, said cleaning device is rotatably mounted on said top end face of said liquid container and, in use, said filter drum is immersed in liquid contained in said container, wherein said filter drum is disposed in said liquid container so that said filter drum is suspended from or standing on one of the said top or bottom end faces and is adapted to be inserted into and removed from said container from above separate from said cleaning device.

* * * * *